Dec. 4, 1962   G. A. KNAPP   3,067,326
VIBRATION-IMPACT PROOF VEHICLE LAMP
Filed Aug. 10, 1960

INVENTOR.
GEORGE A. KNAPP
BY Richard von K. Burns
Atty.

United States Patent Office 3,067,326
Patented Dec. 4, 1962

3,067,326
VIBRATION-IMPACT PROOF VEHICLE LAMP
George A. Knapp, De Witt, N.Y., assignor to R. E. Dietz Company, Syracuse, N.Y., a corporation of New York
Filed Aug. 10, 1960, Ser. No. 48,612
6 Claims. (Cl. 240—41.5)

This invention relates generally to automotive lighting equipment, and has particular reference to an improved vibration-impact proof construction for a vehicle headlamp or work lamp.

Briefly stated, the invention contemplates the provision of a vibration-impact proof lamp that is particularly adapted for use on road tractors, trucks, farm tractors, construction-industrial machinery and other vehicles that are subject to severe vibrations and distortions due to the nature of the work they perform. At the present time, most vehicles of this type employ sealed beam light units in their headlamps and work lamps, and the invention is specifically directed to a novel vibration-impact proof construction for supporting a sealed beam unit in a lamp housing in such a manner that the vibrations and jolting of the vehicle are not transmitted to the unit. It is not intended that the invention be limited to use with sealed beam lights, however, since it will be apparent as the description proceeds that it can also be utilized advantageously with other lamp constructions that may be subject to shock.

With the foregoing considerations in view, therefore, it may be stated that the broad objective of the present invention is to provide a simple yet highly effective vibration-impact proof construction for vehicle lamps.

Another important object of the invention is to provide a vibration-impact proof construction for lamps that is economical to manufacture and can be easily assembled and disassembled.

A further important object of the invention is to provide a vibration-impact proof lamp which is constructed so as to facilitate access to the lamp interior.

A more specific object of the invention is to provide a vibration-impact proof construction which is particularly adapted for supporting a sealed beam light unit in such a manner that the unit is effectively cushioned against vehicle vibrations.

Other objects and advantages of the invention will become apparent from the following detailed description thereof read in conjunction with the accompanying drawings which illustrate a representative embodiment of the invention for the purpose of disclosure.

Having reference now to the drawings, wherein like reference numbers designate the same part in each of the views, 10 indicates the lamp housing which is preferably substantially hemispherical in shape and open on its front side. A hollow mounting bolt 12 is secured to the back of the housing, the latter being provided with a reinforcing plate 14 where the bolt is attached. The bolt is adapted to be connected to a suitable mounting (not shown) on the tractor or truck and a conductor 16 enters the lamp through the bolt as indicated.

Figure 4:
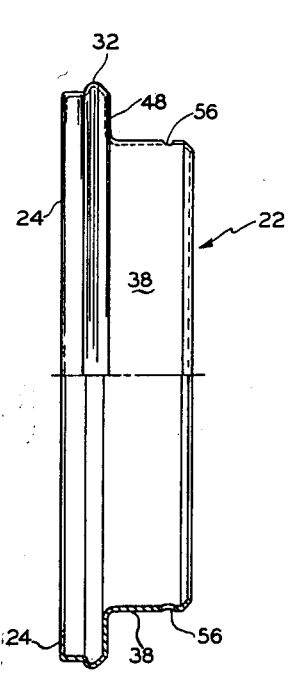
FIGURE 4 is an enlarged side elevation of the light support or cradle member with the lower half being shown in section.
Figure 3:
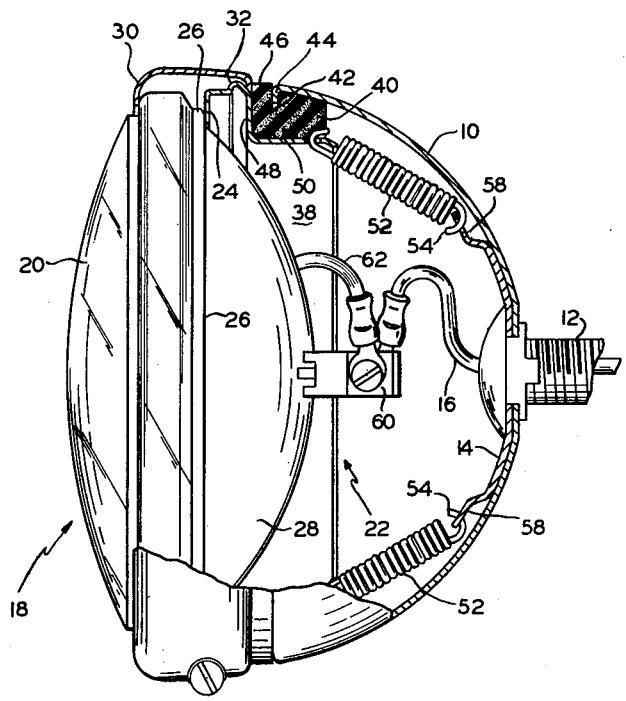
FIGURE 3 is an enlarged side elevation with parts broken away to show the details of the vibration-impact proof construction.

A sealed beam light unit 18 is mounted in the open side of the lamp housing with the lens 20 of the unit facing outwardly as shown. The sealed beam unit is held in position by a support or cradle 22, and the latter is resiliently mounted in the housing in a manner to be presently described. As best shown in FIGURES 3 and 4, the support 22 is substantially annular in form and is provided on its outer or front side with a flange 24 which is engaged by an annular shoulder or edge 26 encircling the rear wall 28 of the sealed beam unit. The rear wall itself projects rearwardly through the opening encircled by the support flange 24 as indicated in FIGURE 3.

Figure 1:
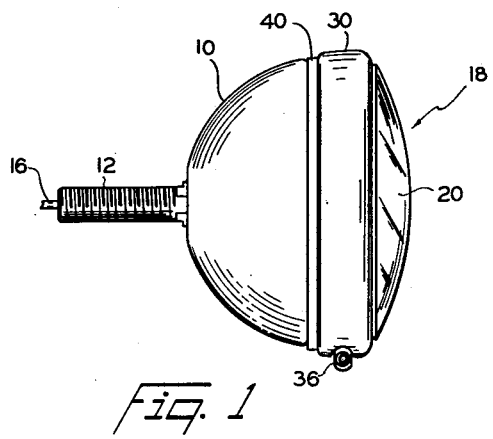
FIGURE 1 is a side elevation of a vibration-impact proof vehicle lamp embodying the invention.
Figure 2:
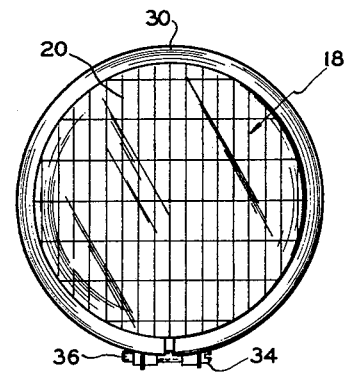
FIGURE 2 is a front elevation of the lamp.

The sealed beam unit 18 is rigidly secured in the above described position by means of a detachable bezel or rim 30 which engages the front edge of the sealed beam rim and an annular bead 32 formed on the support 22. The bezel 30 is in the form of a split ring, FIGURE 2, the ends of which are drawn together by a fastening screw 34 and nut 36 to clamp the ring on the support and hold the parts in assembled relation. For a more detailed description of the bezel and its clamping means, reference may be had to Patent No. 2,458,007, issued Jan. 4, 1949, to the applicant herein.

The support 22 is formed with an inner reduced diameter portion 38 which is adapted to extend partially into the housing in spaced relation thereto. In accordance with the invention, the space between the portion 38 and housing is occupied by a vibration-impact proof member 40 which is preferably a relatively thick ring of sponge rubber or the like. The vibration-impact proof member is formed with a narrow annular channel or groove 42 in its outside wall in which a radially extending flange 44 at the open side of the housing is received to secure the member to the housing.

The groove 42 is located so that a portion 46 of the vibration-impact proof member extends outwardly beyond the front side of the housing for engagement with an annular shoulder 48 located between the outer and inner portions of the support 22. Another portion 50 of the vibration-impact proof member extends radially into the interior of the housing beyond the inside edge of the flange 44 for engagement with the periphery of the reduced diameter portion 38 of the support. With this arrangement, the support, and the sealed beam unit carried thereby, have no rigid metal to metal contact with the rigidly mounted lamp housing 10 and are physically separated therefrom by means of the vibration-impact proof member 40.

The support 22 is retained in position by a plurality of tension springs 52 formed with a hook 54 at each end. The hooks at the outer ends of the springs engage in holes 56 in the reduced diameter portion of the support, and the hooks at the inner ends of the springs engage apertures in extension arms 58 on the reinforcing plate 14. The springs 52 bias the support 22 rearwardly in the housing so that the annular shoulder 48 on the support exerts a compressive force on the outwardly extending portion 46 of the vibration-impact proof member 40. Thus, the vibration-impact proof member and springs coact to cushion the support and sealed beam unit against vibration and impact in both the axial and radial directions. The springs, moreover, provide a firm yet yieldable connection that allows the vibration-impact proof member to operate in the desired cushioning manner, which would not be possible if a rigid connection were substituted for the springs.

Current is supplied to the sealed beam unit 18 through the conductor 16 which is connected in the usual manner to one of the terminals 60 on the rear wall of the unit. The other terminal of the unit is connected to ground through a conductor 62 which is secured at its other end to the lamp housing as by a rivet (not shown). The housing itself is grounded to the vehicle through the mounting bolt 12.

In assembling the above described structure, the vibration-impact proof member 40 is mounted on the housing by engagement of the flange 44 in the annular groove 42. The support 22 is then positioned in the housing as shown, and the springs 52 are connected to the extension arms and support to secure the latter in position. Thereafter, the sealed beam unit 18 is mounted on the front side of the support and the bezel 30 is clamped in position to rigidly connect the sealed beam unit and support together. To disassemble the lamp, just the reverse procedure is followed.

From the foregoing description it will be apparent that the invention disclosed herein provides a simple yet highly effective vibration-impact proof construction for vehicle lamps. As will be understood by those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In a lamp of the character described: a housing having an open side, a light unit, a rigid support for said light unit, clamping means rigidly connecting said light unit to said support, a portion of said support extending into the open side of said housing in spaced relation thereto and another portion of the support being positioned outside of the housing, a resilient vibration-impact proof member positioned between said support and housing, the major portion of said vibration-impact proof member being positioned within said housing, and resilient means detachably holding said support in compressive engagement with said vibration-impact proof member.

2. In a lamp of the character described: a housing having an open side, a sealed beam light unit, a substantially annular rigid support for said light unit, said support having a portion for receiving the rear wall of the light unit and a reduced diameter portion extending partially into said housing in spaced relation thereto, means rigidly connecting said light unit to said support, an annular resilient vibration-impact proof member mounted on the edge of said housing at its open side and occupying the space between the housing and reduced diameter portion of said support, the major portion of said vibration-impact proof member being positioned within said housing, and spring means detachably connecting said support to said housing.

3. A vibration-impact proof vehicle lamp comprising in combination a housing having an open front side, the edge of said housing being turned inwardly adjacent its open side to form a continuous marginal flange, a continuous resilient vibration-impact proof member having a peripheral groove in which said housing flange is received, a portion of said vibration-impact proof member projecting outwardly beyond the front side of said housing and a major portion of the member projecting into the interior of the housing when said flange is positioned in said groove, a light unit, a rigid support for said light unit engaging said vibration-impact proof member, resilient means detachably connecting said support to said housing, said resilient connecting means being operable to hold said support in compressive engagement with the outwardly projecting portion of said vibration-impact proof member, and clamping means to rigidly connect said light unit to said support.

4. A vibration-impact proof vehicle lamp comprising in combination a housing having an open side, an annular resilient vibration-impact proof member, means on said housing engaging said vibration-impact proof member so that a portion thereof extends outwardly beyond the open side of the housing and a larger portion extends into the housing interior, a sealed beam light unit, a substantially annular rigid support for said light unit, said support having a portion receiving the rear wall of said light unit and a reduced diameter portion extending partially into said housing in engagement with said vibration-impact proof member, means rigidly connecting said light unit to said support, and spring means detachably connecting the reduced diameter portion of said support to the interior of said housing.

5. A vibration-impact proof vehicle lamp comprising in combination a substantially hemispherical housing having an open front side, the edge of said housing being turned inwardly adjacent its open side to form a radially extending annular flange, a vibration-impact proof member in the form of a relatively thick resilient annular ring, said vibration-impact proof member having a narrow annular channel in the outside wall thereof in which said housing flange is received to secure the member to the housing, a portion of said vibration-impact proof member projecting outwardly beyond the front side of said housing and a larger portion thereof extending into the interior of the housing beyond the inside edge of said housing flange, a sealed beam light unit, a substantially annular rigid support for said light unit, said support having an outer portion engaging the rear wall of the light unit and an inner reduced diameter portion extending into said housing, the outer and inner portions of said support having an annular shoulder therebetween, said annular shoulder abutting against the outwardly projecting portion of said vibration-impact proof member and the inner reduced diameter portion of the support being engaged in encircling relation by the radially extending portion of the vibration-impact proof member, means rigidly securing said light unit in position in said support, and resilient means detachably connecting said support to said housing.

6. Structure as defined in claim 5 wherein said resilient connecting means comprise a plurality of tension springs each of which is connected at its outer end to the inner reduced diameter portion of said support and at its inner end to the interior of said housing, said springs being operable to hold said annular support shoulder in compressive engagement with the outwardly projecting portion of said vibration-impact proof member.

References Cited in the file of this patent

UNITED STATES PATENTS

| | | |
|---|---|---|
| 1,555,902 | Brady | Oct. 6, 1925 |
| 2,504,327 | Gross | Apr. 18, 1950 |
| 2,686,867 | Livellen et al. | Aug. 17, 1954 |
| 2,733,335 | Falge | Jan. 31, 1956 |
| 2,744,999 | Arnejo | May 8, 1956 |
| 2,762,908 | Gaither | Sept. 1, 1956 |
| 2,800,578 | Falge | July 23, 1957 |
| 2,979,603 | Falge | Apr. 11, 1961 |